3,318,334
CONDUIT WITH ENLARGED END AND METHOD
OF FORMING SAME
Joe E. Fuzzell, Peoria, Ill., assignor to Caterpillar Tractor
Co., Peoria, Ill., a corporation of California
Filed Apr. 6, 1964, Ser. No. 357,615
4 Claims. (Cl. 138—109)

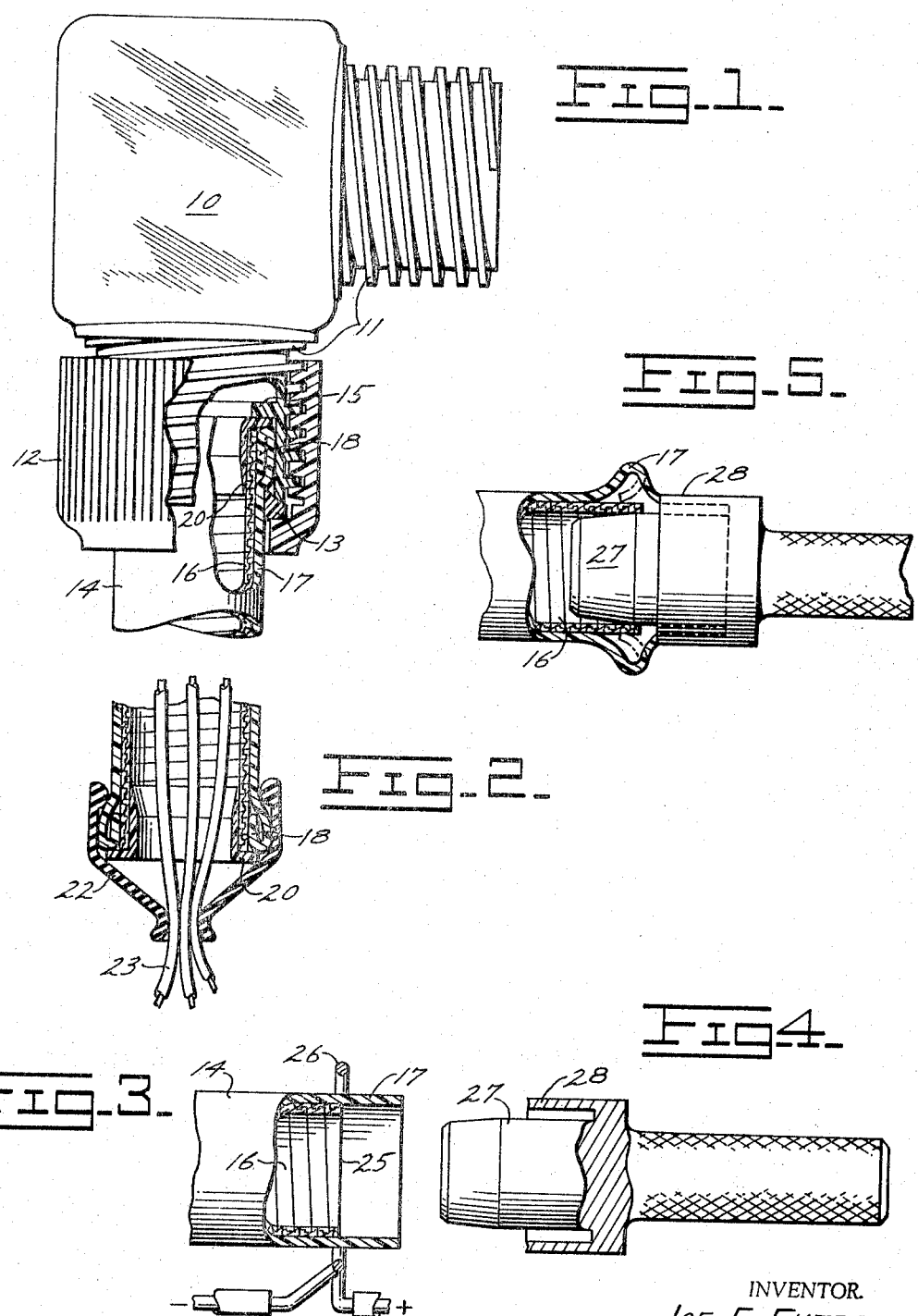
May 9, 1967     J. E. FUZZELL     3,318,334
CONDUIT WITH ENLARGED END AND METHOD OF FORMING SAME
Filed April 6, 1964
INVENTOR.
JOE E. FUZZELL
BY
ATTORNEYS

United States Patent Office 3,318,334
Patented May 9, 1967

This invention relates to the securing of conduits to fittings as in making protective coverings for electric wiring systems and more particularly to the formation of an enlargement at the end of a cut length of conduit which enables the formation of a secure connection between the conduit and the fitting.

One type of conduit widely used for the protection of electric wiring comprises a flexible metal tubular body covered with plastic material in tubular form. This conduit is used with fittings such as T's, elbows, junction boxes and the like to suit any desired electrical circuit and the fittings have tubular outlets into which ends of the conduit are inserted. The fitting outlets are provided with an external thread and an internally threaded nut or gland is slidable over the conduit and threaded to the outlet. Various means have been employed to provide an enlargement at the end of the tubing to insure against its being withdrawn from the fitting when the gland is in place and to cover the sharp edges of the metallic part of the conduit where it has been cut to length.

It is the object of the present invention to provide an improved conduit end suitable for the purpose described and a method of producing such an end.

Further and more specific objects and advantages of the invention and the manner in which it is carried into practice are made apparent in the following specification wherein reference is made to the accompanying drawing.

In the drawing:

FIG. 1 is a plan view of an elbow with a conduit end embodying the present invention in one outlet thereof and with parts broken away better to disclose the nature of the invention;

FIG. 2 is a central sectional view through a conduit end showing the application of an elastic boot thereto;

FIG. 3 is a view partially in section of a conduit end undergoing preparation for the formation of an enlargement thereat in accordance with the present invention;

FIG. 4 is a view partially in section of a tool employed for performing the method of the present invention; and FIG. 5 is a view of the conduit end of FIG. 3 and tool of FIG. 2 illustrating the manner in which the tool functions.

The elbow illustrated in FIG. 1 is to be taken as typical of any fitting or junction box which has threaded outlets for the reception of the ends of conduits and is illustrated as having a body member 10 and threaded outlets 11. An internally threaded gland 12 is threaded onto the outlet and bears against a ring 13 to confine an enlarged and protective end of a conduit shown at 14 between the ring and an internal flange 15 formed in the threaded outlet. It is the enlarged end of the conduit 14 to which the present invention is directed.

The conduit 14 is shown as comprising a metal body 16 which is a flexible tubular element formed by a spirally wound and interlocking ribbon of metal as most clearly appears in FIGS. 2, 3 and 5. A plastic tube 17 embraces the body 16 and forms a moisture proof covering therefor. The enlarged and protected end of the conduit is formed by extending the plastic covering a short distance beyond the metal body member and then folding or tucking the covering inwardly upon itself to provide an end portion which lies between the covering and the metal body member as illustrated at 18 in FIGS. 1 and 2. This provides an enlargement or sort of bead adjacent the end of the conduit to positively prevent its being withdrawn beyond the ring 13 when the gland 12 has been threaded into place.

Since insulated wires are drawn through the conduit and fitting, care is taken to prevent abrasion of the insulation by engagement with sharp edges of the metal portion of the conduit. Such protection of the wires is afforded by a plastic ferrule shown at 20 having a cylindrical portion which slides into the conduit, as shown, and a flange which overlies the end of the conduit thus covering the metallic portion thereof. This flange is clamped between the end of the conduit and the shoulder 15 of the fitting outlet and cooperates with the conduit and the fitting in providing a smooth raceway through which wires may be drawn without danger of destroying their insulation.

The conduit end illustrated in FIG. 1 is also useful as shown in FIG. 2 for retaining an elastic boot 22 in place on the end of the conduit where wires such as indicated at 23 leave the conduit but do not enter a fitting of the kind illustrated in FIG. 1. The elastic boot provides security against any large quantity of moisture or foreign material entering the conduit ends.

The method of forming the conduit end of FIGS. 1 and 2 is illustrated in FIGS. 3, 4 and .5 In FIG. 3, the metal conduit body 16 is illustrated as having been sheared at 25 and the plastic covering 17 is shown as having been extended beyond the sheared end of the metal body. There are various ways in which the plastic can be caused to exceed the length of the conduit but it is quite simple with this type of conduit simply to stretch the plastic slightly which is accomplished by gripping the conduit remote from its end in one hand and adjacent its end in the other hand and pulling upon the plastic covering to extend it to the position illustrated in FIG. 3. When the plastic covering is so stretched, it is preferably heated as with an annular electric heating element schematically shown at 26 to render it pliable. A tool such as shown in FIG. 4 may be employed to force the conduit end into the position illustrated in FIGS. 1 and 2. This tool has a pilot end 27 of a size to provide a sliding fit with the conduit body 16 surrounded by a tucking annulus 28 of the same diameter as the plastic conduit cover 17. As shown in FIG. 5 when the pilot portion 27 is inserted in the metal body 16, the tucking annulus 28 engages the terminal end of the plastic covering 17 and, since it has been softened by heat, folds it inwardly upon itself progressing from the full line position illustrated to the dotted line position shown and continuing until the position of FIG. 2 is attained. It is then simply necessary to insert the ferrule 20 shown in FIG. 1 to obtain the desired terminal end of the conduit in a manner which is less expensive and more effective than such terminal ends presently known in the art.

I claim:

1. In a conduit which comprises a tubular metal body enclosed by a plastic cover, an enlargement adjacent the end of the conduit comprising a portion of the plastic cover folded back upon itself and disposed between the body and the cover and extending to the end of the metal body, and said tubular metal body being form sustaining whereby the enlargement projects outwardly of the tubular conduit.

2. The structure of claim 1 with a ferrule having a tubular portion extending into the metal body and having a flange projecting radially to overlie the end of the metal body and the folded edge of the plastic cover.

3. The method of forming an enlarged end on a conduit having a metal body and a plastic cover therefor which comprises stretching the cover to exceed the length of the body and then tucking the exceeding length of cover back upon itself to a position between the body and the cover.

4. The method of claim 3 including the step of heating the plastic cover in preparation for the step of tucking.

References Cited by the Examiner

UNITED STATES PATENTS

| | | | |
|---|---|---|---|
| 1,118,451 | 11/1914 | Sloper | 138—129 X |
| 2,155,487 | 5/1939 | Hatch | 229—4.5 |
| 2,288,966 | 7/1942 | Blanchet | 138—109 X |
| 2,395,754 | 2/1946 | O'Neil et al. | 229—4.5 X |
| 2,686,962 | 8/1954 | Swann | 285—149 X |
| 3,015,133 | 1/1962 | Nichols | 138—139 X |

LAVERNE D. GEIGER, *Primary Examiner.*

SAMUEL ROTHBERG, *Examiner.*

C. L. HOUCK, *Assistant Examiner.*